INVENTORS,
H. L. HULL, R. C. GOERTZ,
& W. C. HARTMAN;
BY
THEIR ATTORNEY.

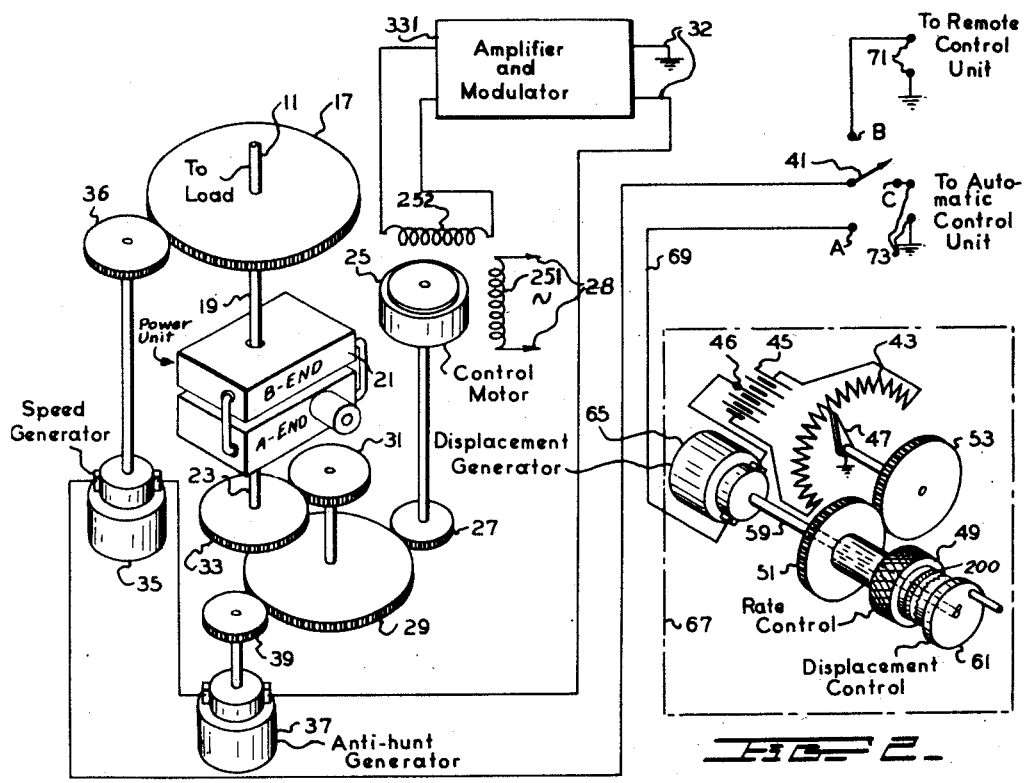
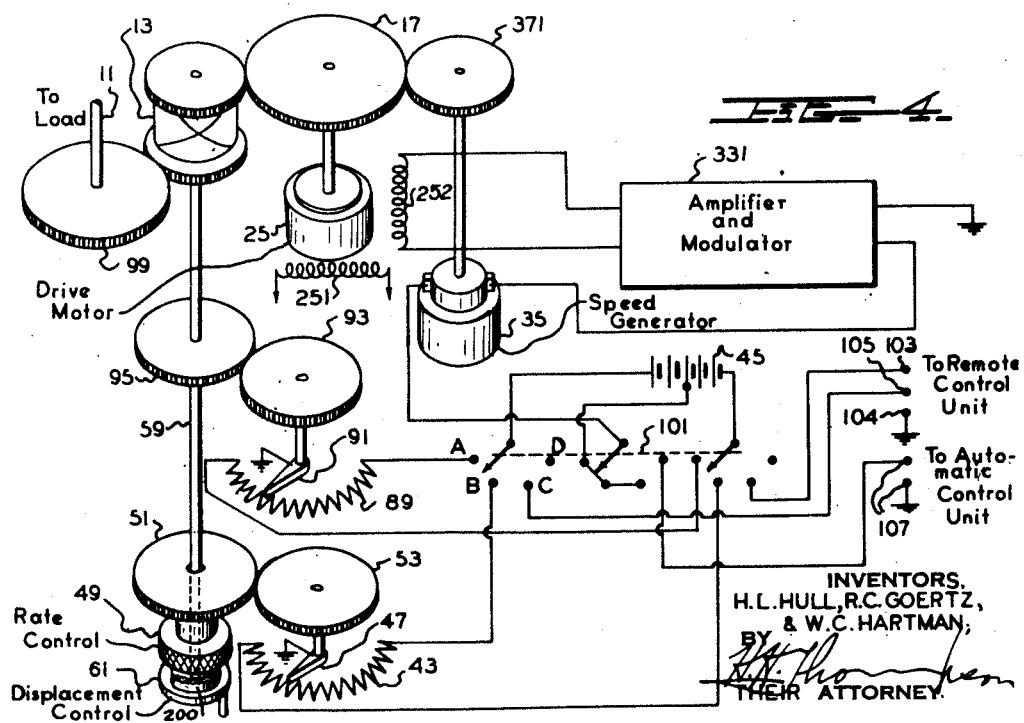

Oct. 24, 1950     H. L. HULL ET AL     2,526,665
POSITIONAL CONTROL SYSTEM
Filed Jan. 24, 1942     3 Sheets-Sheet 3
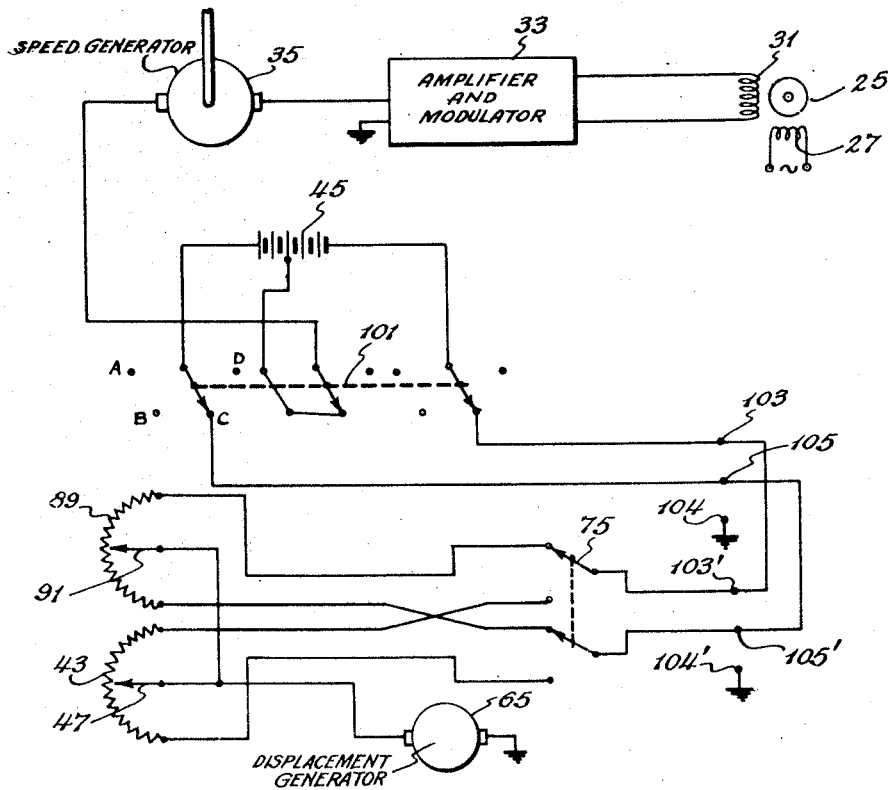
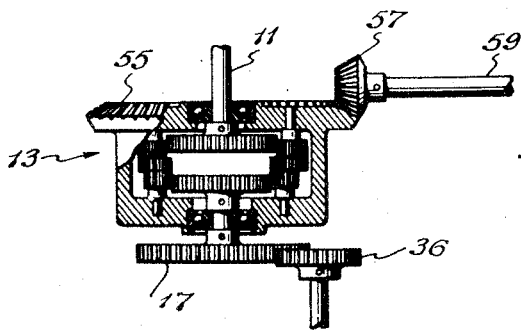
INVENTORS
H.L.HULL, R.C.GOERTZ,
AND W.C.HARTMAN.
BY
Herbert H. Thompson
ATTORNEY.

Patented Oct. 24, 1950

2,526,665

UNITED STATES PATENT OFFICE 2,526,665

POSITIONAL CONTROL SYSTEM

Harvard L. Hull, Garden City, Raymond C. Goertz, Hempstead, and William C. Hartman, Bohemia, N. Y., assignors to The Sperry Corporation, a corporation of Delaware Application January 24, 1942, Serial No. 428,030

14 Claims. (Cl. 60—53)

The present invention is directed toward control devices such as positioning control systems, tracking control systems, follow-up systems, and the like.

The present application is a continuation-in-part of copending application Serial No. 403,618 for Handle Tracking Control, filed July 23, 1941, now Patent No. 2,414,102, in the names of H. L. Hull, W. C. Hartman and R. C. Goertz, and assigned to the same assignee as the present application. The prior application was directed toward tracking control systems. The present invention is concerned with further developments along the lines of the prior application directed toward general positioning systems, such as positional control, tracking control, follow-up systems, variable speed devices, etc.

It is an object of the present invention to provide improved control apparatus for controlling the position and/or speed of a power-operated object.

It is another object of the present invention to provide an improved aided tracking control means for power-operated objects.

It is a further object of the present invention to provide improved displacement control means for power-operated objects, adapted for remote control and/or aided tracking where desirable.

It is a further object of the present invention to provide improved control units for power-operated objects incorporating aided tracking and anti-hunting features.

Other objects will be apparent from the appended specification and drawings wherein several modifications and embodiments of the invention are disclosed.

In the drawings,

Fig. 2 shows a perspective schematic representation of a modification of Fig. 1 including an improved displacement control.

Fig. 4 shows a perspective schematic representation of a further modification of the invention including selective aided tracking control and also adapted for use with the remote control unit of Fig. 3.

Fig. 5 shows a circuit diagram of a modification of the remote control unit of Fig. 3; and Fig. 6 schematically illustrates the differential mechanism employed in one form of the present invention.

Figure 1:
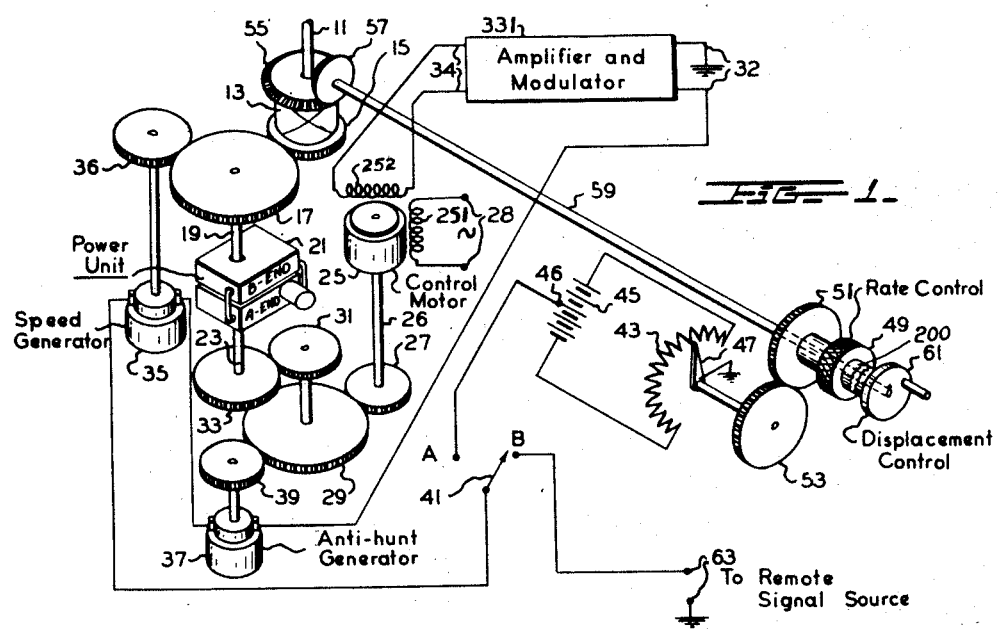
Fig. 1 shows a perspective schematic representation of a positioning or tracking device embodying some features of the present invention.

Referring to the drawings,

Fig. 1 shows one form of the invention. The load or driven device (not shown) is connected to be driven from output member 11 of a differential 13, one of whose driving members 15 is connected, as by a gear 17, to the output shaft 19 of the B-end of an adjustable displacement variable speed hydraulic transmission 21, which may be of the well-known "Vickers" type. The stroke rod 23 of the input or A-end of this hydraulic transmission 21 is controlled as to position by a motor 25 through gearing 27, 29, 31 and 33. Motor 25 may be of the two-phase type having one winding 251 energized from a suitable source of alternating current 28, and a second winding 252 energized from the output of a combined amplifier and modulator unit 331.

The "Vickers" type of variable speed hydraulic transmission or servomotor, as is well known in the art of servomotors, includes two parts, one of which is termed the "A" end and the other the "B" end. The "A" end comprises a variable displacement pump which is driven by a suitable motor such as a constant speed electric motor (not shown). The "B" end comprises a hydraulic motor which is driven by the fluid pumped from the "A" end. Suitable pipe connections serve as a means for circulating the fluid between the "A" and "B" ends of the servo. The "A" end also includes a control member 23, usually termed the stroke rod, which serves to vary the stroke or displacement of the pump. In the central or neutral position of the control member, no fluid is circulated between the "A" and "B" ends. However, when the control member is moved in one direction from a central position, the displacement of the pump is increased as the control member is moved farther away from its neutral position and, hence, the position of the control member is a measure of the speed or rate of the output of the "B" end. When the control member is moved from a neutral position in the opposite direction, it reverses the direction of circulation of fluid between the "A" and "B" ends while controlling pump displacement. Hence, the control member serves to control both the direction and rate or speed of the output of the "B" end of the servo. Reference may be made to Patent No. 2,189,823, issued to H. F. Vickers et al., February 13, 1940, and Patent No. 1,794,946, issued to J. J. Crain, March 3, 1931, for a more detailed description of the well known "Vickers" drive.

The speed of the output shaft 19 of transmission 21 is therefore substantially proportional to the angular displacement of the stroke rod 23 which corresponds to the control member of the "A" end of the Vickers unit described in the foregoing paragraph. However, this proportionality relationship holds accurately only over a restricted range of speeds. For fairly small output speeds, this relationship does not hold, due to the unavoidable lost motion and hydraulic leakage encountered in such units.

In order to provide a greater range of maximum to minimum speeds which may be accurately controlled, a separate speed standard is provided in the form of a generator 35 which is also driven from the output end 19 of the hydraulic transmission 21 by means of a gear 36 engaging gear 17. This generator 35 is chosen to have a voltage output strictly proportional to its speed for a wide range of speed variation, that is, for a large ratio of maximum to minimum speed.

One suitable type of such a generator is the permanent-magnet-field direct-current generator. The output of this generator 35 is connected in series with a further generator 37, which may be of the same type as generator 35, and which is driven in accordance with the stroke rod 23 of the A-end of the hydraulic transmission 21 by way of gears 33, 31, 29 and 39. With control switch 41 in the left position or in engagement with contact A, the voltages of generators 35 and 37 are connected in series with the voltage obtained from potentiometer 43 and and the resultant voltage is connected to the input of amplifier-modulator unit 331.

Potentiometer 43 is connected across battery 45 and is adapted to produce across ground and mid-terminal 46 (which alternatively may be connected to a center tap on potentiometer 43) a reversible polarity unidirectional voltage proportional to the angular displaceemnt of the variable arm 47 of potentiometer 43 from its central or neutral position. Arm 47 is controlled from a control knob or controller 49 by way of gears 51 and 53.

Neglecting for the moment the function of generator 37, which will be later described, and assuming for purposes of illustration that the system is initially at rest with potentiometer 43 at its central position, then, upon displacement of potentiometer 43 from this central position by a certain amount, a direct voltage is produced across the input terminals 32 of the amplifier-modulator unit 331. Unit 331 is adapted to produce across its output terminals 34 an alternating voltage proportional in magnitude to the magnitude of the input direct voltage and having a phase sense corresponding to the polarity of the input voltage. Amplifier-modulator unit 331 is also adjusted to saturate at a low value of input voltage; that is, for any value of input voltage greater than this saturating value, the output voltage remains fixed. This saturating value is selected to be very small in comparison with the normal voltage outputs of generators 35 and 37. A suitable type of amplifying and modulating unit 331 is shown in Fig. 5 of the above-mentioned copending application Serial No. 403,618, now Patent No. 2,414,102.

The direct voltage produced across input terminals 32 by displacement of potentiometer 43 creates a corresponding current in winding 252 of motor 25, and thereby rotates motor 25 at a speed corresponding to the magnitude of the input voltage, if this input voltage does not exceed the saturating value of unit 331. If this saturating value is exceeded, motor 25 will rotate at its maximum speed. Rotation of the output shaft 26 of motor 25 causes a displacement of the stroke rod or shaft 23 of the A-end of transmission 21, and thereby causes the output shaft 19 of this unit 21 to rotate at a speed corresponding to the displacement of shaft 23.

The rotation of output shaft 19 then causes generator 35 to generate a voltage proportional to this speed. This voltage is connected to oppose the voltage derived from potentiometer 43 and hence to decrease the input voltage to the amplifier-modulator unit 331. The gearing is so selected that until the voltage produced in generator 35 attains a value equal to that of the voltage produced in potentiometer 43, motor 25 will continue to rotate and thereby continue to increase the speed of generator 35 and the output shaft 19 of the servomotor which is connected, in the embodiment herein illustrated, through differential 13 with the load shaft 11.

It will be clear that motor 25 can cease rotating only when the input to amplifier-modulator unit 331 becomes zero. This equilibrium condition can be obtained only when the output of generator 35 is exactly equal to the voltage set in potentiometer 43 and when this happens motor 25 and stroke rod 23 will stop and remain stationary while output shaft 19 and load shaft 11 will continue to rotate a speed corresponding to the angular displacement of potentiometer arm 47.

If potentiometer 43 is linearly wound, the output speed of the device will be exactly proportional to the angular displacement of arm 47 and hence control 49 will be proportional rate control. It is not necessary, however, that potentiometer 43 be linearly wound, since it may be desirable for some conditions of operation that the output speed be not strictly in proportion to the input displacement. In such case, potentiometer 43 may be wound non-linearly to obtain any desired law of variation.

In the above manner, the output speed of the device is accurately controlled by comparison with a reference speed standard comprising generator 35, but the proportionality of the displacement of arm 47 to output speed of the "Vickers" unit 21 is no longer alone depended upon to produce the desired output speed.

Generator 37 provides an additional component of non-hunting and damping control during changes in the speed output. The voltage output of generator 37 will be proportional to the speed of stroke shaft 23 of hydraulic transmission 21. Since the displacement of stroke rod 23 is approximately proportional to the speed of output shaft 19, the speed of stroke rod 23, and the voltage output of generator 37 proportional thereto, is therefore at least approximately proportional to the acceleration of the output shaft 19 to which is connected the load or driven device represented by shaft 11. By connecting the output of generator 37 in series with the input of amplifier-modulator unit 331, hunting and speed lag is reduced to a minimum. In effect, generator 37 provides an anticipating booster effect responsive to the rate of change of operation of stroke rod 23 to cause changes to occur quickly, without appreciable lag or hunting.

The system thus far described comprises a pure rate control, since only the output speed is under the control of the operator by means of control 49. In order to provide additionally a displacement control, a third member 55 of differential 13 is driven mechanically by means of gear 57, shaft 59 from a handle 61, which for convenience is made concentric with rate control 49. By rotation of handle 61, output shaft 11 is directly rotated through an angle proportional to the angular displacement of control 61. If desired, the displacement control 61 and the rate control 49, instead of being independently operable, may be ganged together either by a clutch 200 (Fig. 2) or movable gearing or other suitable means to provide a combined rate and displacement control known as "aided tracking." Hence, joint or separate operations of the displacement control 61 or the rate control 49 may be effected in controlling the servomotor output. It will be clear that a variable ratio between the rate and displacement controls may be provided by variable or adjustable gearing.

If desired, a remote control may be used, in which case switch 41 is thrown to the right-hand position B. This cuts out the potentiometer 43 and places the device under the control of any voltage which may be impressed across terminals 63. Such a voltage may be derived from a remotely situated potentiometer and battery arrangement similar to 43—45, from the output of any suitable type of tracking control, such as shown in application Serial No. 403,618, now Patent No. 2,414,102, or from an automatic error measuring device or any automatic control, such as a radio locator. The remote control unit of Figs. 3 and 5 may also be used here.

This remote or automatic control will also be a speed or rate control, in that the magnitude of the control voltage across terminals 63 will be proportional to the output speed of the device. However, a displacement control may also be provided, in the form shown in Fig. 3, which illustrates a remote control unit more fully described below but capable of use with Fig. 1.

The device of Fig. 1 has been shown as a manually controlled system, and as such has many applications, as in tracking a rapidly moving target with a telescope, gun, searchlight, sound locator, gun director, etc. However, this device is in no way restricted to the uses just mentioned. When the signal connected to terminals 63 represents a displacement, lag or error signal, the device may be used as an automatic positioning control system, as a servosystem or as a follow-up system.

Furthermore, where manual control is used, it is not necessary to use the battery and potentiometer arrangement 43, 45 to secure the control voltage, as any suitable type of reversible-polarity signal generating means may be employed. Thus, an inductive control such as disclosed in application Serial No. 403,618, now Patent No. 2,414,102, with proper demodulations may be used.

In addition control motor 25 need not be of the alternating current type, as a direct current variable speed motor may also be used. In such case, the modulator portion of device 331 may be omitted, and the direct current motor directly controlled by the several voltages, through a suitable direct current amplifier.

Fig. 2 shows a system similar to that of Fig. 1 with a modified displacement control, the rate control being exactly the same as in Fig. 1. Thus, in Fig. 2, differential 13 illustrated in Fig. 1 together with the direct connection 59 to it from displacement control handle 61 have been eliminated. Instead, displacement control 61 now actuates another generator 65 which may be of the same type as generators 35 or 37. The output of generator 65, when switch 41 is in position A, is connected in series with the other voltages connected to the input 32 of amplifier-modulator 331.

In operation, assuming output shaft 11 to be stationary, a displacement of control 61 through a fixed angle will result in a voltage pulse being generated in generator 65. At each instant of time this voltage will be proportional to the rate of displacement of control 61. Accordingly, it will be clear that the time integral of this voltage will be proportional to the fixed angle through which control 61 is displaced.

If the system is operating perfectly and following the control signal instantaneously, this voltage pulse would result in a variation of speed of output shaft 11 having exactly the same variation with time as does the instantaneous voltage of the pulse generated in generator 65, in accordance with the action described with respect to Fig. 1. The displacement angle of shaft 11 due to the change in speed will be the time integral of the speed curve with respect to time. Since the speed curve is the same as the voltage pulse curve, the integrals of each are equal, so that the angular displacement of shaft 11 is equal (or proportional) to that of control 61. It will be clear that reverse displacement of control 61 will reverse the polarity of the voltage pulse produced and will accordingly displace shaft 11 in the reverse direction.

If output shaft 11 is rotating at fixed speed when control 61 is displaced, the result obtained will be that the position of shaft 11 will be advanced or retarded with respect to the position it would have had without such displacement, by an amount proportional to the displacement of control 61.

The foregoing described function of controller 61 to introduce a displacement into the output of the Vickers unit or to move the load shaft 11 through an angular displacement proportional to the displacement of controller 61 may be more clearly understood by assuming for the moment that the power unit has zero output speed, i. e., is stationary. Under these conditions, it is further assumed that the controller 61 is moved through any given angular displacement, thereby causing generator 65 to supply a voltage pulse to the amplifier-modulator 331. The output of the amplifier-modulator will cause motor 25 angularly to position the control member or stroke rod 23 of the Vickers unit in accordance with the voltage pulse supplied thereto. Under the assumption first above made, the Vickers unit output shaft will accelerate from zero to a rate proportional to the setting of the shaft 23. The rate generator 35, driven by the output shaft of the Vickers unit, will supply a voltage to the amplifier-modulator which is of opposite polarity to the voltage pulse supplied from the generator 65 thereby, assuming the pulse from generator 65 has gone to zero, causing control motor 25 to operate in a reverse direction to return the control input shaft 23 of the Vickers unit to its original position, thereby stopping the servo. Therefore, the load shaft 11 will be angularly displaced an amount proportional to the displacement of controller 61. A similar action will occur when the servo is driving the load at any speed setting according to the position of the wiper 47 on the potentiometer from which the speed or rate control signal is derived.

The above remarks were made on the assumption of perfect action of the system. In practice, by suitable adjustment of the gearing and output of generator 37, such perfect action can be closely approximated and the system will therefore operate to give a displacement control in response to displacement of control 61.

It will be clear that displacement control 61 acts independently of rate control 49 if the clutch 200 is out. If the clutch is in, however, the rate and displacement controls are simultaneously actuated, whereby aided tracking is secured.

The operation of the system of Fig. 2 is as follows. By the term "rate signal," we mean a signal which in magnitude is proportional to the speed or rate of an object such as a controller, while a "displacement term" is a component of angular displacement. The operation of the system shown in Fig. 2 under the displacement voltage obtained from the potentiometer 43 is similar in all respects to the operation obtained with the system, for example, of Fig. 1. Let us assume that no voltage is derived from potentiometer 43, that is, that no dispacement signal controlling the rate of the servo is supplied to the servo control amplifier. When the control 61 of Fig. 2 is rotated, the generator 65 which is drivably mounted on the shaft thereof, will provide a voltage output proportional to the speed at which the controller 61 is rotated. This voltage, amplified by means of amplifier 331, is fed to the field 252 of the control motor 25. Motor 25 will therefore rotate, producing a displacement of the stroke rod 23 of the Vickers unit from, let us assume, a neutral position wherein the output rate of the Vickers unit is zero. As soon as rotation of the control 61 ceases, the voltage output from generator 65 becomes zero and hence, control motor 25 will then cease displacing the stroke rod 23 whereupon the output rate of the Vickers unit will become constant at a speed depending upon the amount the stroke rod is displaced from its neutral position due to the voltage derived from generator 65. However, as long as there is a rate output from the Vickers unit, speed generator 35, driven thereby, will supply a voltage which is fed to amplifier 331 in opposition to the voltage derived from the generator 65. Hence, although the voltage from generator 65 will tend to produce acceleration of the Vickers unit, while it lasts, the voltage from the speed generator 35 will tend to produce deceleration. For example, when control 61 is no longer rotated and the signal output from generator 65 has gone to zero, the output from speed generator 35 will cause the control motor 25 to reverse its operation and restore the stroke rod 23 to its original position, that is, the assumed neutral position wherein the rate output of the Vickers unit is zero.

From the foregoing, it should be seen that the generator 65 will provide a voltage output which in magnitude is proportional to the rate at which the control 61 is rotated and for a time duration equal to that during which the control is rotated. Likewise, the speed generator 35 provides a voltage output having a magnitude proportional to the rate of the output of the Vickers unit and for a time duration equal to that during which the Vickers unit provides a rate output. Hence, when the magnitude with respect to time of these voltages is equal or proportional as reflected by a movement of the control motor from an initial position under the control of the voltage derived from generator 65 and a return of said motor to its initial position under the control of the voltage from generator 35, the output of the Vickers unit will have been moved through some displacement. This displacement is equal to the servo speed, a variable, times the time period over which it operates or is the integral of the speed with respect to time. Since the servo speed and its time duration is equal or proportional to the rate voltage derived from generator 65, it follows that the displacement is, therefore, proportional to the rate of movement of the control 61.

The foregoing discussion has been supplied under the assumption that no voltage is supplied from the potentiometer 43. However, when the servo mechanism operates under the joint control of voltages derived from potentiometer 43 and from generator 65, the foregoing will take place but additionally the output of the servo mechanism will include a rate term which is dependent upon the setting of the potentiometer 43. All rate terms in the servo output necessarily provide a displacement over a period of time, but with the present arrangement, an additional displacement proportional to the speed at which the control 61 is operated is immediately provided in the servo output.

It should be noted in Fig. 2 that the apparatus enclosed in dotted line 67 need be connected to the main system only by wire 69 and a ground connection. Accordingly, the device within dotted line 67 may be used remotely from the main device as a remote control unit. Switch 41 is provided to switch over from local control, as in position A, to remote control, as in position B, in which case terminals 71 would be connected by wires to the remote control unit. If desired, automatic control from a radio control unit, a follow-up device or other tracking unit may be provided by switching over to terminal C of switch 41, terminals 73 being connected to the reversible polarity unidirectional output voltage of such a control unit.

Figure 3:
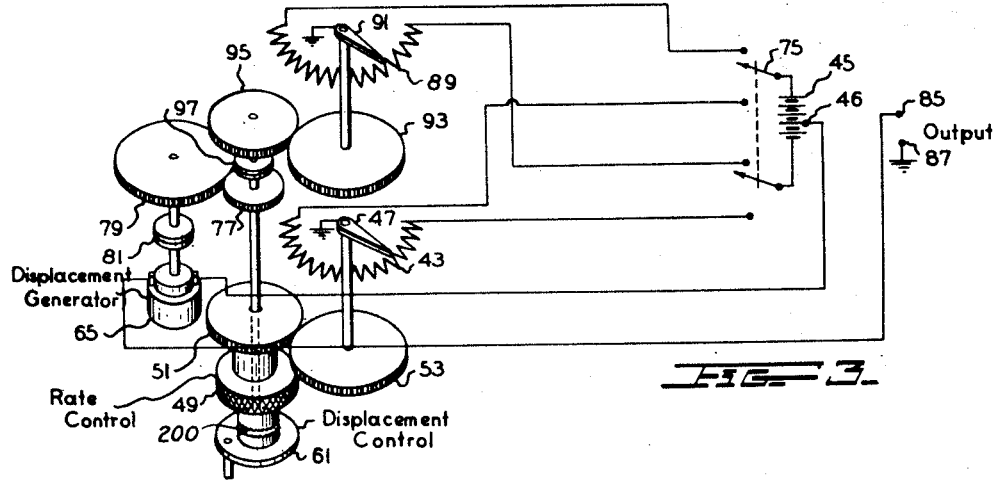
Fig. 3 shows a perspective schematic representation of a remote control unit including a selective aided tracking control, suitable for use with the devices of Figs. 1 and 2.

Fig. 3 shows a remote control unit suitable for use with the circuit of Fig. 2. Here, rate control 49 again actuates grounded arm 47 of potentiometer 43 through gears 53 and 51, potentiometer 43 being connected across battery 45 through a switch 75 when in the lower position. Displacement control 61 is connected to generator 65 as before, through gearing 77, 79 and a slip clutch 81. Generator 65 is connected in series with the midpoint 46 of battery 45 and the output terminal 85 so that the output voltage derived across terminals 85, 87 is of the same type as that across wire 69 and ground in Fig. 2, namely a combined rate and displacement control voltage, each component being independently controlled.

However, instead of optionally gearing the rate control to the displacement control as suggested with respect to Figs. 1 and 2, a second potentiometer 89 is provided whose grounded movable arm 91 is driven directly from the displacement control 61 through gearing 93, 95 and slip clutch 97. Potentiometer 89 is connected across battery 45 when switch 75 is in the upper position.

The operation of the controller 61 in Fig. 3 to provide a rate and displacement control voltage should be evident from the foregoing description directed to Fig. 2, wherein these terms are introduced through separate controllers. However, when switch 75 is in the upper position, the controller 61 of Fig. 3 functions to supply a rate voltage from the potentiometer 89 and a displacement voltage from the generator 65, the controller serving as a common means to actuate the arm of the potentiometer and the displacement generator. The controller displacement supplies a rate term and the rate of motion of the controller displacement or its first derivative supplies a displacement term in the output of the servomotor.

Accordingly, it will be seen that with switch 75 in the lower position, the rate and displacement controls are entirely independent. With switch 75 in the upper position, actuation of the displacement control 61 alone will provide both rate and displacement action, resulting in aided tracking. The gear ratio between the potentiometer 89 and generator 65 may be made adjustable if desired by means of change gears or any other well known device. It will be clear that the method of obtaining aided tracking shown in Fig. 3 may also be applied to Fig. 2, instead of the clutch mechanism 200 there shown.

The remote control unit of Fig. 3 may also be used with Fig. 1, terminals 85, 87 being then connected to terminals 63 of Fig. 1. In that case, local displacement control 61 is not used, and differential 13 acts as a simple gear train.

More particularly, the remote control unit of Fig. 3 may be embodied in the circuit of Fig. 1, or substituted for the corresponding control circuit of Fig. 1, by connecting the output of the circuit of Fig. 3 to the input of the amplifier-modulator 331 of Fig. 1. Under these conditions, the switch 41 is thrown to the B position and the output terminal 85 of the Fig. 3 circuit is connected to the input terminal 63 of the Fig. 1 circuits. With a connection of this character, and assuming that switch 75 occupies the upper position, the potentiometer 89 provides a signal proportional to a desired output speed of the servomotor 21. The generator 35 supplies a signal proportional to the output speed of the servomotor and an anti-hunt generator 37 provides a signal proportional to the rate of change of position of the stroke rod 23 of the A-end of the hydraulic unit. All of these signals are algebraically combined due to the series-connection of the signal sources and supplied to the input of the amplifier-modulator 331. The relative sign or polarity sense of the signals is determined by the relationship in which the signal sources are interconnected in the input circuit to the amplifier. It will be noted that an additional control signal is derived from the generator 65 and this signal is also algebraically combined in the input to the amplifier-modulator since it is connected between the output terminal 85 of the circuit of Fig. 3 and the battery 45. The signal derived from generator 65 is proportional to the rate of motion of the controller 61. When the switch 75 is in the upper position signals are derived both from the generator 65 and the potentiometer 89 when controller 61 is operated. However, when the switch 75 is in the lower position, these signals are derived separately, the signal from the generator being obtained through an operation of control 61 while the signal proportional to a desired output speed of the servomotor is derived from potentiometer 43 which is separately actuated by the knob 49. In either case, depending upon the position of switch 75, the signals derived from the circuit of Fig. 3 are combined with those derived from the speed generator 35 and anti-hunt generator 37 of Fig. 1 and supplied to the input of amplifier-modulator 331. Of course, under these conditions, the manual controls shown in Fig. 1 may be dispensed with.

It is not necessary to use the hydraulic transmission 21 as the actual motive source, as shown in Figs. 1 and 2. Thus, Fig. 4 shows a further modification in which electric motor 25 is used as the actual motive source, driving the output shaft 11 directly through gearing 99 and differential 13. A generator 35 is driven directly from motor 25 through gearing 17 and 371. Also, as in Fig. 1, the displacement control 61 operates mechanically through a shaft 59 and through differential 13 and gear 99 to couple it to the output shaft 11 directly.

As disclosed with respect to Fig. 3, two potentiometers 43 and 89 are provided for rate control in the Fig. 4 device, potentiometer 43 being driven from rate control knob 49 through gearing 51 and 53 while potentiometer 89 is driven from displacement control 61 by means of shaft 59 and gearing 95, 93.

A throwover switch 101 having four positions A, B, C, D is provided. With switch 101 in position A, battery 45 is connected across potentiometer 89 and aided tracking is obtained. With switch 101 in position B, battery 45 is connected across potentiometer 43, and independent rate and displacement control is obtained. In position C of switch 101, battery 45 is connected across wires 103 and 105 which may be connected to a remote control unit. This remote control unit may be similar to that shown in Fig. 3. However, it is no longer necessary to have battery 45 or other source of unidirectional voltage located at the remote point, as this voltage may be fed to the remote unit over wires connected to terminals 103, 104, 105. Hence the circuit of this remote control unit may be as in Fig. 5, the mechanical details being the same as in Fig. 3.

In Fig. 5, switch 75 selects either aided tracking rate control potentiometer 89 or independent rate control potentiometer 43, battery 45 being connected to the potentiometer selected by way of terminals 105', 103' connected respectively to terminals 105, 103. Displacement generator 65 is connected in series with potentiometer arms 91, 47 and terminal 104', which is connected to terminal 104 of Fig. 4.

Referring again to Fig. 4, with switch 101 in position D, the local controls are entirely cut out and the only control of amplifier-modulator 331 is obtained from whatever remote or automatic control signal is placed across terminals 107.

The operation of the device of Fig. 4 is slightly different from that of Figs. 1 and 2. In Figs. 1 and 2 equilibrium conditions were obtained when motor 25 was stationary, in which case the voltage output of generator 35 exactly balanced the voltage set in by means of potentiometer 43. Accordingly, since the voltage obtained from generator 35 is exactly proportional to the speed of output shaft 11, a system operating without lag is obtained. That is, the speed of output shaft 11 corresponds exactly to the setting of potentiometer 43 (or 89 if the remote unit of Fig. 3 or 5 is used therewith). In Fig. 4, on the other hand, at equilibrium, with the system operating at constant speed, amplifier-modulator 331 must yield an output sufficient to maintain motor 25 at that constant speed. This means that an input voltage must exist across the input terminals 32 of amplifier 331 which necessitates a slight difference between the voltages produced in generator 35 and in the control potentiometer 43 or 89. As stated before, however, amplifier-modulator 331 is made very sensitive and saturates at a low value so that only a very small voltage is necessary across its input terminals to provide full speed output from motor 25. This very small voltage causes a very small difference in speed between the speed of output shaft 11 and the speed set in by means of the control potentiometer 43 or 89. This speed difference is proportional to the speed, and accordingly, offers no practical difficulties when using direct or remote control, as it simply requires a proportional recalibration of the speed scale associated with the manual control or aided control potentiometers. With automatic control, however, this lag exists, but is negligible in view of the very small voltage difference, in comparison to the generator 35 voltage and the control voltage, needed to drive the amplifier-modulator unit 33 and motor 25.

It will be clear that the system of Fig. 4 may be modified in the same manner as Fig. 1 was modified as shown in Fig. 2, by removing the direct connection between displacement control 61 and output shaft 11 and using instead the displacement generator 65 as shown in Fig. 2, and connected as already described with respect to Fig. 5.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a servo system, the combination with a servomotor having a control member, said servomotor being characterized by the fact that the output speed thereof is dependent upon the position of said control member, of means for providing signals proportional to the desired output speeds of said servomotor, means comprising a signal voltage generator driven by the output of said servo for supplying a signal proportional to the output rate of said servo, means for combining said signals in opposed relationship, and means responsive to the combined signals for controlling the position of said control member, said first mentioned signal being effective through said signal-responsive means to cause a change in position of said control member in a direction to change the speed of said servo toward the desired speed until substantially equally opposed by said rate signal voltage whereupon said control member will remain stationary in a position providing a servo speed equal to the desired speed.

2. In a servo system, the combination with a servomotor having a control member, said servomotor being characterized by the fact that the output speed thereof is dependent upon the position of said control member, of means for providing signal voltages proportional to desired output speeds of said servomotor, a generator driven by the output of said servo for supplying a signal voltage proportional to the output rate thereof, means for combining said two signals in opposed relationship, means for amplifying the difference between the two voltage signals, means for positioning said control member, and means responsive to the output of said amplifier for controlling said positioning means, said first mentioned signal voltage being effective through said signal-responsive means to cause a change in position of said control member in a direction to change the speed of said servo toward the desired speed until substantially equally opposed by said rate signal voltage whereupon said control member will remain stationary in a position providing a servo speed equal to the desired speed.

3. In a servo system, the combination with a servomotor having a control member, said servomotor being characterized by the fact that the output speed thereof is dependent upon the position of said control member, of means for providing signal voltages proportional to desired output speeds of said servomotor, generator means driven by the output of said servo for producing a signal voltage proportional to the output speed of said servo, means for combining said signals in opposed relationship, and a motor controlled by the combined signals for positioning said control member, said first mentioned signal voltage being effective to cause said last mentioned motor to change the position of said control member in a direction to change the speed of said servo toward the desired speed until substantially equally opposed by said servo-output-speed signal voltage whereupon said control member will remain stationary in a position providing a servo speed equal to the desired speed.

4. In a servo system, a servomotor having a source of power therefor and an output, displaceable means for providing a displacement signal having a magnitude dependent upon a displacement thereof and proportional to a desired servomotor output rate, control means for actuating said displaceable signal-providing means, means for producing a rate signal proportional to the rate of motion of said control means, and means responsive to said signals for controlling said servomotor, the output rate of said servomotor being proportional to the displacement signal and the rate signal being integrated by said servomotor whereby to provide a displacement term in the servo output.

5. In a servo system, a servomotor having a source of power therefor and an output, a first controller, means actuated thereby for supplying a control signal depending in magnitude upon the displacement of said controller, a second controller, means for producing a signal proportional to the rate of motion of said second controller, means for causing conjoint operation of said controllers, and means responsive to a combination of said control signals for controlling said servomotor.

6. In a servo system, a servomotor having a source of power therefor and an output, servo control means including a displaceable means for providing a signal voltage dependent in magnitude upon the displacement thereof and proportional to a desired servomotor output rate, control means for actuating said displaceable signal-providing means, means for producing a signal voltage proportional to the rate of motion of said control means, and means responsive to said signal voltages for controlling the output of said servo, the output rate of said servo being proportional to the displacement of said control means and said rate signal being integrated by said servo whereby to provide a displacement term in the servo output.

7. In a servo system, a servomotor having a source of power therefor and an output, servo control means including a displaceable means for providing a signal voltage dependent in magnitude upon the displacement thereof and proportional to a desired servomotor output rate, control means for actuating said displaceable signal-providing means, a signal voltage generator associated with said control means for producing a signal voltage proportional to the rate of motion of said control means, and means responsive to said signal voltages for controlling the output of said servo, the output rate of said servo being proportional to the displacement of said control means and said rate signal being integrated by said servo whereby to provide a displacement term in the servo output.

8. In a servo system, the combination with a servomotor having a control member, said servomotor being characterized by the fact that the output speed thereof is dependent upon the position of said control member, of means for providing a signal proportional to a desired output speed of said servomotor, means for producing a signal proportional to the output speed of said servo, means for combining said signals in opposed relationship, a controller for actuating said first-mentioned signal-providing means, means for producing a signal proportional to the rate of motion of said controller, and means responsive to the combined signals and said last-mentioned signal for controlling the position of said servomotor control member, said first mentioned signal being effective through said signal-responsive means to cause a change in position of said control member in a direction to change the speed of said servo toward the desired speed until substantially equally opposed by the servo-output-speed signal whereupon said control member will remain stationary in a position providing a servo speed equal to the desired speed, and the rate signal proportional to the rate of movement of the controller being integrated by said servo to provide a displacement term in the servo output.

9. In a servo system, the combination with a servomotor having a control member, said servomotor being characterized by the fact that the output speed thereof is dependent upon the position of said control member, of means for providing a signal voltage proportional to a desired output speed of said servomotor, generator means driven by the output of said servo for producing a signal voltage proportional to the output speed of said servo, means for combining said two signal voltages in opposed relationship, a controller for actuating said first-mentioned signal-providing means, a signal voltage generator associated with said controller for producing a signal voltage proportional to the rate of motion of said controller, and means responsive to the combined signals and said last-mentioned signal voltage for controlling the position of said servomotor control member, said first mentioned signal voltage being effective through said signal-responsive means to cause a change in position of said control member in a direction to change the speed of said servo toward the desired speed until substantially equally opposed by the servo-output-speed signal voltage whereupon said control member will remain stationary in a position providing a servo speed equal to the desired speed, and the rate signal voltage proportional to the rate of movement of the controller being integrated by said servo to provide a displacement term in the servo output.

10. In a servo system, a servomotor having a power supply therefor and an output, servo control means including a first displaceable controller, means actuated thereby for supplying a control signal voltage proportional to the amount of displacement of said controller, a second displaceable controller, means for producing a signal voltage proportional to the rate of motion of said second controller, means responsive to both control signal voltages for controlling said servomotor, and means for coupling said controllers for joint movement, the output rate of said servomotor being dependent upon the magnitude of the signal voltage proportional to displacement of the controller and the rate signal voltage being integrated by said servo whereby to provide a displacement term in the servo output.

11. In a servo system, the combination with a servomotor having a control member, said servomotor being characterized by the fact that the output speed thereof is dependent upon the position of said control member, of means for providing signal voltages proportional to desired output speeds of said servomotor, a first controller for actuating said signal-providing means, means for producing a signal voltage proportional to the output speed of said servo, means for combining said signal voltages in opposed relationship, a second controller, means for producing a signal voltage proportional to the rate of motion of said second controller, and means responsive to the combined signal voltages and said last-mentioned signal voltage for controlling the position of said servomotor control member.

12. A servo system of the character recited in claim 11 in which the means for producing a signal voltage proportional to the rate of motion of the said second controller comprises a signal voltage generator operatively connected with said second controller.

13. In a servo system, the combination with a servomotor having a control member, said servomotor being characterized by the fact that the output speed thereof is dependent upon the position of said control member, of means for providing signal voltages proportional to desired output speeds of said servo motor, means for producing a signal voltage proportional to the output speed of said servo, means for combining said signals in opposed relationship, a motor for positioning said control member, means responsive to said signals for controlling the operation of said last-mentioned motor, a controller for actuating said first-mentioned signal-providing means, means for producing a signal proportional to the rate of motion of said controller, and means for supplying said last-mentioned signal to said signal-responsive means.

14. In a servo system, the combination with a servomotor having a control member, said servomotor being characterized by the fact that the output speed thereof is dependent upon the position of said control member, means for providing signal voltages proportional to desired output speeds of said servomotor, means for producing a signal voltage proportional to the output speed of said servo, means for combining said signals in opposed relationship, a motor for positioning said control member, means responsive to the combined signals for controlling the operation of said last-mentioned motor, a first controller for actuating the first mentioned signal-providing means, a second controller, means for producing a signal voltage proportional to the rate of motion of said second controller, and means for supplying the last-mentioned signal voltage to said signal-responsive means.

HARVARD L. HULL.
   RAYMOND C. GOERTZ.
   WILLIAM C. HARTMAN.

REFERENCES CITED

The following references are of record in the file of this patent:

UNITED STATES PATENTS

| Number | Name | Date |
|---|---|---|
| 1,603,137 | Meyer | Oct. 12, 1926 |
| 2,115,086 | Riggs | Apr. 26, 1938 |
| 2,131,759 | Satterlee | Oct. 5, 1938 |
| 2,160,779 | Granat | May 30, 1939 |
| 2,189,823 | Vickers et al. | Feb. 13, 1940 |
| 2,235,551 | Garman | Mar. 18, 1941 |
| 2,291,011 | Vickers | July 28, 1942 |
| 2,331,218 | Montelius | Oct. 5, 1943 |
| 2,414,102 | Hull et al. | Jan. 14, 1947 |